July 25, 1950
F. WHITTLE
2,516,819
EXHAUST SYSTEM
Filed Aug. 24, 1945
2 Sheets-Sheet 1
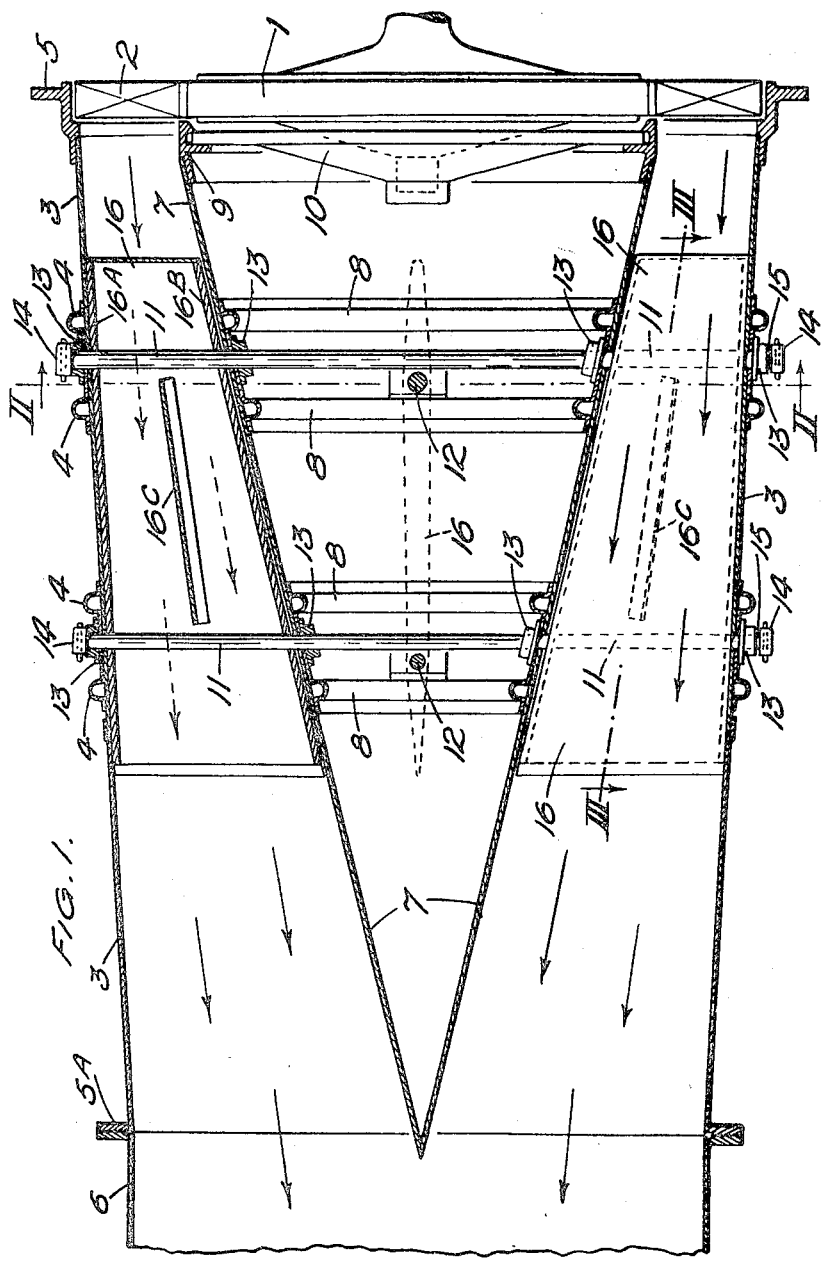
Inventor
Frank Whittle
By Stevens and Davis
his Attnys

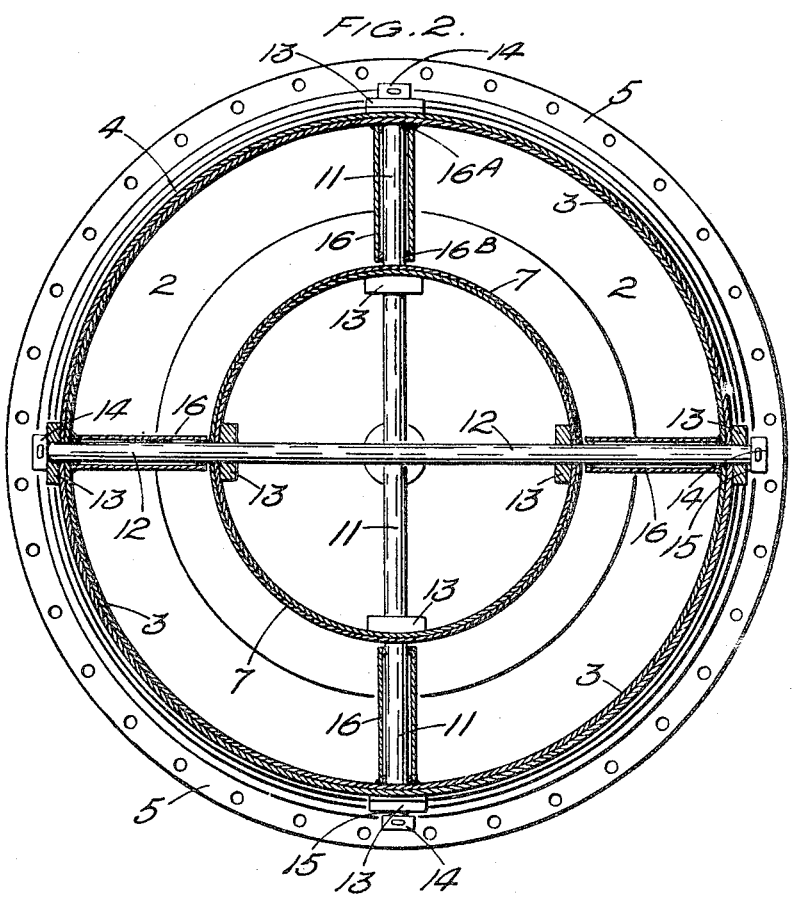
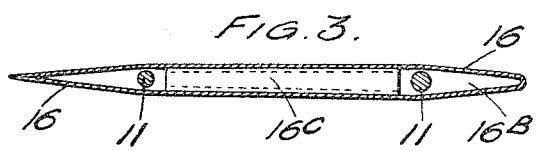

Patented July 25, 1950

2,516,819

UNITED STATES PATENT OFFICE 2,516,819

EXHAUST SYSTEM

Frank Whittle, Rugby, England, assignor to Power Jets (Research & Development) Limited, London, England Application August 24, 1945, Serial No. 612,467
In Great Britain February 2, 1942

7 Claims. (Cl. 138—69)

This invention relates to turbine machines and more especially to gas turbines. In some such machines when the exhaust from the turbine or the last stage thereof is axial and passes out through an annular duct, the disc or wheel is faired off by a fixed body of approximately conical or streamline shape, which is required to be located coaxially in the exhaust duct. The primary object of the invention is to provide a practicable mode of fixing this fairing or cone, able to withstand high fluid velocities and temperatures, and such as to avoid or minimize the setting up of undue stresses. Another object is, in some cases, to afford a means of fixing such a cone, with the minimum of resistance to fluid flow even though the conditions of operating may be such that the direction of flow varies somewhat; for example in one condition of operation the fluid flow may be axial, and in another, somewhat helical, and it may be desirable to avoid fluid resistance in both conditions.

According to the invention such a fairing or cone is mounted and located by rods or rod-like members which extend from or through the walls of the duct within which the cone is to be located, preferably diametrically, and these pass through the structure of the cone. In the annular space between the duct wall and the cone, the otherwise exposed lengths of rod may be enclosed within or shielded by streamline fairings, and these may be fixed or allowed to swivel in order to take up angles of minimum drag. When fixed they may be used to act as flow straighteners, and to that end they may be of unsymmetrical aerofoil section or of symmetrical section but appropriately pitched. The rods are at least two in number, and are positioned at such angles with reference to each other that they locate the cone in the two transverse dimensions, whilst one or all of them also effects axial location.

The rods may have locating elements either fixed or adjustable, to bear against the duct walls, or the cone internally or externally, or both.

An example of the invention is illustrated by the accompanying drawings, in which Fig. 1 is a sectional elevation view, Fig. 2 a sectional view on line II—II of Fig. 1, and Fig. 3 a section on line III—III of Fig. 1. The structure as described is adapted to form part of the exhaust system of a gas-turbine adapted for jet-propulsion of aircraft.

A single stage turbine is diagrammatically indicated with its wheel at 1 and blades 2. The discharge from the turbine annulus is confined by an outer wall 3 of frusto-conical form, which can be regarded as the outer wall of a duct, and which may be reinforced by external ribs such as 4, or as may be desired. A flange 5 attaches the wall 3 to the shrouding ring of the turbine (not shown) and a further flange 5A is provided for attachment to the smaller end of the wall 3 of an exhaust pipe 6. A fairing cone is mounted coaxially within the wall 3. This is a sheet-metal structure having a wall 7, suitably reinforced internally as by ribs 8, and having around the edge of its base a machined rim 9 to which is attached, or with which is integral, a so called pad 10 which forms in effect an end closure of the base of the cone, and which is dished and otherwise shaped to correspond approximately with the shape of the downstream side of the wheel 1, leaving such clearances as may be expedient. The cone structure formed by 7 and 10 is allowed to "breathe" by suitable small holes being provided in regions which may be selected so as not to produce any marked pressure differences between inside and outside of the cone unless circulation of gas is required in which case pressure difference localities may be purposely chosen. The cone is so dimensioned that its base registers with the blank rear face of the turbine, and rearwardly thence, it is proportioned so as to determine the cross-sectional area of the annular gas passage between the walls 3 and 7, as may be requisite. There may be for example some degree of effective divergence in this passage so that it acts as a diffuser, decreasing the velocity and raising the pressure of the gas.

The inner conical structure as a whole must of course be supported robustly and with considerable accuracy despite the arduous thermal conditions arising in use. This is achieved by supporting it on two pairs of diametrically arranged rods. One pair of these is shown at 11, 11, and the second at 12, 12. Associated rods 11, 12, are arranged at right angles to each other (and to the axis of the cone). Each rod 11 or 12 passes through the wall 3 at each end, and passes through the wall 7. The fits are free though not given substantial clearance. (Each rod is, for example, usually rotatable by hand after assembly, though such rotation may be checked by any suitable locking means such as wiring.) Where the rods pass through the walls bushes are provided as at 13. The rods are located endwise by external collars or nuts at 14, each locked by a split-pin or similar means, and as can be seen at 15 an endwise clearance is provided to allow for thermal expansions. The (in this example) four rods constitute a complete supporting system for the inner cone, ensuring its coaxiality with the wall 3 and permitting radial changes of dimension due to thermal expansion.

The rods, where they traverse the gas passage, are enclosed in sheet-metal fairings of streamline form. These are made of a wall 16 internally supported by ribs 16A, 16B which lie respectively against the walls 3, 7, and a further intermediate rib 16C. The sheet wall is welded to the edges of these ribs which edges may be flanged up for the purpose. The rib 16A may be welded locally to the wall 3, or 16B to wall 7, (but not both) finally to locate and hold the fairings and to prevent the parts fretting on each other by vibration, whilst still allowing for expansion for which radial clearance is left.

In certain cases the fairings may be of asymmetrical aerofoil section or they may be given a selected pitch angle so as to correspond with, or to tend to correct, the direction of the gas stream passing them. It will be seen that it is not essential structurally, for the pairs of rods, e. g. 11, 11, to lie in a common plane, and selection of the form or angle of the fairings may prescribe the exact disposition of the rods.

In a variant each exposed length of rod may have its own section of fairing, which may be constructed so as to be free to swivel on the rod to take up a neutral incidence to the gas stream, "weathercocking" with any change of stream direction.

It has not been deemed necessary to enlarge upon the method of manufacture of the assembly since this can be greatly varied. It may, however, be stated that satisfactory results have been achieved, using heat resisting non-corrosion steels for practically all the elements, and using the technique of spot and seam welding at practically all permanent joints and attachments. Thus the walls 3 and 7 are made from single sheets of metal, seam-welded longitudinally, and the flanges 5, 5A are spot welded to the wall 3. The bush bosses 13 are spot welded to the walls, or may be gas-welded. The reinforcing ribs are spot welded; they may be of varied sections, for example of L or Z form.

It will be observed that the inner cone structure may be removed merely my freeing and withdrawing the rods. If very accurate adjustment of location is required, the rods may be bushed in eccentric and adjustable bushes allowing various small adjustments to be made. The downstream point of the inner cone may be made as a solid machined part, welded to the wall 7.

I claim:

1. An exhaust structure for a turbine comprising an outer duct-defining wall, an inner element spaced from said wall and having a complementary duct-defining surface, and at least two rod-like members passing transversely through said wall and said element and being slidably engaged with said element in planes at an angle one to the other and to the axis of said wall.

2. An exhaust structure for a turbine comprising an outer duct-defining wall, an inner element spaced from said wall and having a complementary duct-defining surface, and at least two rod-like members extending across the duct so defined and being secured in said wall and passing transversely with slidable engagement through said element in planes at an angle one to the other and to the axis of said wall.

3. An exhaust structure for a turbine comprising an outer duct-defining wall, an inner element spaced from said wall and having a complementary duct-defining surface, and supporting means extending across the duct so defined and supporting said wall and said element so as to afford relative location between said wall and said element in all senses except radially with respect to the duct.

4. An exhaust structure for a turbine comprising an outer duct-defining wall of circular section, an inner element of circular section disposed spacedly and co-axially within said wall and having a complementary duct-defining surface, and supporting means extending across the annular duct so formed comprising at least two rod-like members each passing through said element and supporting said wall and element with freedom limited to radial sliding freedom with respect to said wall and element, said members being in planes at an angle one to the other and to the common axis of said wall and element.

5. An exhaust structure for a turbine comprising an outer duct-defining wall of circular section, an inner element of circular section disposed spacedly and coaxially within said wall and having a complementary duct-defining surface, supporting means extending across the annular duct so defined and having connection with the wall and element such as to afford permanent relative location between wall and element in all senses except radially with respect to said wall and element, and fairing means extending across the said annular duct enclosing said supporting means.

6. An exhaust structure for a turbine comprising an outer duct-defining wall in the form of a frusto-conical circular-sectioned hollow body, an inner element in the form of a cone comprising a complementary duct defining surface coaxially spaced from said wall, and supporting means extending across the annular duct so formed comprising diametrically disposed rod-like members arranged in pairs, each member being engaged with said wall and said element with freedom limited to radial sliding freedom with respect to said wall and element, the members of each pair being at right angles to each other and to the common axis of said wall and element and nearly co-planar, the pairs being spaced axially one from another.

7. A structure according to claim 6 in which said members are retained by stops secured to ends of said members which project outside said body with expansion clearance from the body.

FRANK WHITTLE.

REFERENCES CITED

The following references are of record in the file of this patent:

UNITED STATES PATENTS

| Number | Name | Date |
|---|---|---|
| 1,065,118 | Doering | June 17, 1913 |
| 2,207,522 | Smith et al. | July 9, 1940 |
| 2,393,808 | Ponomareff | Jan. 29, 1946 |

FOREIGN PATENTS

| Number | Country | Date |
|---|---|---|
| 15,364 | France (Add. to 431,862) | of 1912 |
| 319,776 | Germany | Apr. 3, 1920 |
| 126,707 | Great Britain | May 22, 1919 |